United States Patent [19]

Kunieda et al.

[11] Patent Number: 5,369,161
[45] Date of Patent: Nov. 29, 1994

[54] PROCESS FOR INSULATING HIGH VOLTAGE ELECTRICAL CONDUCTING MEDIA

[75] Inventors: Shigehiko Kunieda, Iwakura; Shigeo Ishino, Niwa; Takao Nakai, Ichinomiya; Kazuo Hirai, Kimitsu; Takao Matsushita, Kisarazu; Kazuhide Takeshita, Chiryu, all of Japan

[73] Assignees: NGK Insulators, Ltd., Aichi; Dow Corning Toray Silicone Co., Ltd., Tokyo, both of Japan

[21] Appl. No.: 995,351

[22] Filed: Dec. 22, 1992

Related U.S. Application Data

[63] Continuation of Ser. No. 735,440, Jul. 25, 1991, abandoned.

[30] Foreign Application Priority Data

Jul. 26, 1990 [JP] Japan ................. 2-196139

[51] Int. Cl.$^5$ .............................................. C08K 5/54
[52] U.S. Cl. ................................. 524/266; 174/100; 524/437; 524/588
[58] Field of Search ............... 524/266, 588, 437, 436; 174/110

[56] References Cited

U.S. PATENT DOCUMENTS

| | | | |
|---|---|---|---|
| 3,511,698 | 5/1970 | Talcott | 428/447 |
| 3,965,065 | 6/1976 | Elliott | 524/430 |
| 4,320,044 | 3/1982 | Nakamura | 524/437 |
| 4,355,129 | 10/1982 | Dams | 524/435 |
| 4,418,171 | 11/1983 | Hall | 524/268 |
| 4,476,155 | 10/1984 | Niemi | 427/58 |
| 4,771,099 | 9/1988 | Itoh et al. | 524/862 |
| 5,240,984 | 8/1993 | Takahaski et al. | 524/266 |

FOREIGN PATENT DOCUMENTS 59-198604 11/1984 Japan.
02-132151 5/1990 Japan.

*Primary Examiner*—Veronica P. Hoke
*Attorney, Agent, or Firm*—Scully, Scott, Murphy & Presser

[57] ABSTRACT

A process for insulating high voltage conducting media by insulating such media with a silicone rubber composition capable of being converted to a rubbery elastomer superior in high voltage electrical insulating characteristics is provided. The composition comprises the following components (a) to (e) and not containing a platinum catalyst:

(a) 100 parts by weight of an organopolysiloxane gum;
(b) 10–100 parts by weight of a finely divided silica filler;
(c) 15–300 parts by weight of aluminum hydroxide;
(d) 1–20 parts by weight of a OH terminated organosilane or organosiloxane oligomer; and
(e) 0.05–6 parts by weight of an organic peroxide.

5 Claims, 2 Drawing Sheets

FIG. I
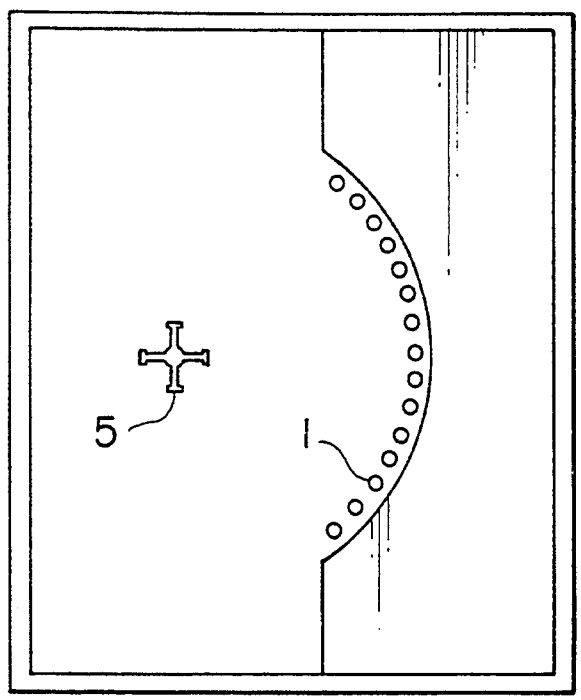
FIG. 2
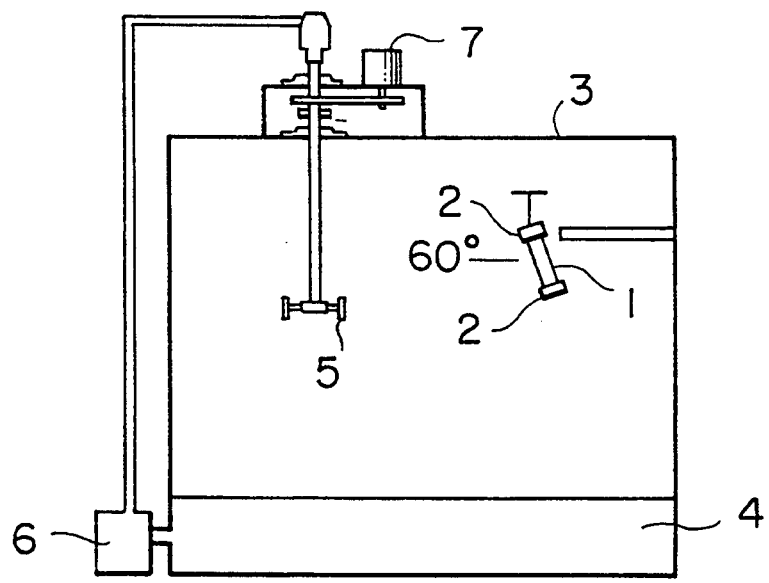

PROCESS FOR INSULATING HIGH VOLTAGE ELECTRICAL CONDUCTING MEDIA

This is a continuation of copending application(s) Ser. No. 735,440 filed on Jul. 25, 1991 now abandoned.

BACKGROUND OF THE INVENTION

The present invention relates to a silicone rubber composition which on heat-curing can afford a rubbery elastomer superior in high voltage electrical insulating characteristics.

High voltage electrical insulators such as those (e.g. suspension insulator and LP insulator) for transmission lines, etc. and those used in insulating devices (e.g. a bird guard device and a lightning arrester device) for transmission lines, etc. are generally made of porcelain or glass. Under ordinary working conditions, these high voltage electrical insulators stand long use. However, when they are used under a severe contaminative environment, for example, when they are used in a district extending along the seaside or in an industrial district, a leakage current of a high level may be generated by a high electrical stress, or there may occur a dry band discharge which leads to flashover.

In view of such problems there have been proposed various methods for remedying the drawbacks of high voltage electrical insulators made of glass or porcelain.

For example, in U.S. Pat. No. 3,511,698 there is proposed a weather-resistant high voltage electrical insulator comprising a thermosetting resin and a cured, platinum catalyst-containing organopolysiloxane elastomer having a thickness of 0.2 mm or more.

In Japanese Patent Laid Open No. 198604/1984 it is taught that by applying one-part type room temperature-curable organopolysiloxane composition to an outer surface of an electrical insulator made of glass or porcelain there can be retained a high electrical performance even in the presence of outdoor stress such as humidity, contamination, or ultraviolet rays.

Further, in Japanese Patent Publication No. 35982/1978 and U.S. Pat. No. 3,965,065 it is taught that a silicone rubber composition improved in ordinary electrical insulating properties is obtained by heating an organopolysiloxane-aluminum hydrate mixture which is converted to rubber on heat-curing, to a temperature higher than 100° C. for 30 minutes or more.

However, the high voltage electrical insulator disclosed in U.S. Pat. No. 3,511,698 involves the problem that there occurs a localized erosion phenomenon because the organopolysiloxane elastomer contains a platinum catalyst.

The high voltage electrical insulator disclosed in Japanese Patent Laid Open No. 198604/1984 involves the problem that a long time is required because of a one-part type room temperature-curable silicone composition is cured at room temperature.

In all of the prior art refrences, the high voltage electrical insulating performance of the silicone rubber material itself cannot be said fully satisfactory. Under severe contaminative or weather conditions, the silicone rubber material undergoes a high electrical stress, thus causing such a deterioration phenomenon as tracking phenomenon or erosion phenomenon, resulting in that the high voltage electrical insulating performance thereof is deteriorated markedly.

Having made extensive studies for overcoming the above-mentioned problems, the present inventors accomplished this invention.

It is the object of the present invention to provide a silicone rubber composition for high voltage electrical insulators capable of being converted to a rubbery elastomer superior in high voltage electrical insulating characteristics such as resistance to weather, to erosion, to tracking and to arc under severe contaminative or weather conditions after heat-curing.

SUMMARY OF THE INVENTION

The present invention relates to a silicone rubber composition for high voltage electrical insulators, comprising the following components (a) to (e) and not containing a platinum catalyst:

(a) 100 parts by weight of an organopolysiloxane gum represented by an average unit formula of

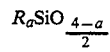

wherein R is a monovalent hydrocarbon group, of which at least 50 mole % is alkyl, and a is a number of 1.98 to 2.02;

(b) 10–100 parts by weight of a finely divided silica filler;

(c) 15–300 parts by weight of aluminum hydroxide;

(d) 1–20 parts by weight of an organosilane or organosiloxane oligomer represented by the general formula

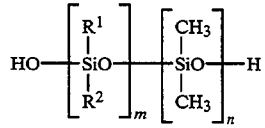

wherein $R^1$ and $R^2$, which may be the same or different, are each an unsubstituted or substituted monovalent hydrocarbon group, at least one of which is phenyl, m is an integer of 1 to 20 and n is an integer of 0 to 20; and (e) 0.05–6 parts by weight of an organic peroxide.

DETAILED DESCRIPTION OF THE INVENTION

In the organopolysiloxane gum as component (a) of the foregoing formula used in the present invention, R is a substituted or unsubstituted monovalent hydrocarbon group (preferably 1 to 18 carbon atoms), examples of which are alkyl groups (preferably 1 to 6 carbon atoms) such as methyl, ethyl and propyl; alkenyl groups (preferably 2 to 6 carbon atoms) such as vinyl and allyl; cycloalkyl groups such as cyclonexyl; aralkyl groups (preferably 7 to 12 carbon atoms) such as β-phenylethyl; and halogenated alkyl groups such as 3-chloropropyl and 3,3,3-tripropyl. At least 50 mole % of R is an alkyl group, preferably methyl. In the above formula of component (a), a is 1.98 to 2.02. A diorganopolysiloxane gum with a being 2 is preferred. The molecular weight of such diorganopolysiloxane gum is not specially limited. Any of those called organopolysiloxane gum in this industry is employable. Usually, one having a viscosity at 25° C. of higher than $10^6$ cSt and an average molecular weight of larger than $5 \times 10^4$, preferably larger than $30 \times 10^4$ is used.

The finely divided silica filler used as component (b) may be one which has heretofore been used in the preparation of silicone rubber, with no special limitation being placed thereon. Examples are fumed silica, sedimentation process silica, and silica aerogel. Particularly, fumed silica of ultra-fine particles smaller than 50 mµ in particle diameter and larger than 100 m²/g in specific surface area is preferred. There also may be used a surface-treated silica, e.g. a hydrophobic silica surface-treated with organosilane, hexaorganodisilazane, or diorganocyclopolysiloxane.

As to the amount of component (b), if it is too small, the mechanical strength of the resulting silicone rubber will be deteriorated, while if it is too large, it will become difficult to use a high proportion of aluminum hydroxide as component (c). In view of these points the amount of component (b) to be used is in the range of 10 to 100, preferably 20 to 80, parts by weight, based on 100 parts by weight of component (a).

Aluminum hydroxide as component (c) is known to improve the arc resistance of silicone rubber and is essential to the composition of the present invention. It is expressed by the formula Al₂O₃.3H₂O and has an average particle diameter of preferably smaller than 5 µm, more preferably smaller than 1 µm. As to the amount of component (c), if it is too small, the arc resistance necessary for maintaining the service life will be lost, while if it is too large, the processability will be deteriorated to the extent of processing being difficult. In view of these points the amount of component (c) to be used is in the range of 15 to 300, preferably 50 to 200, parts by weight, based on 100 parts by weight of component (a).

The organosilane or organosiloxane oligomer as component (d) is an essential component for improving the resistance to weather, to tracking and to erosion, like component (c). In the foregoing formula of component (d), R¹ and R² are the same or different and are each an unsubstituted or substituted monovalent hydrocarbon group (preferably 1 to 18 carbon atoms), at least one of which is phenyl, m is an integer of 1 to 20 and n is an integer of 0 to 20. For example, the organosilane or organosiloxane oligomer can be prepared by hydrolyzing methylphenyldichlorosilane or diphenyldichlorosilane or by co-hydrolysis of methylphenyldichlorosilane and dimethyldichlorosilane. The following are mentioned as examples of such component (d):

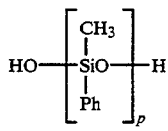

wherein p is a number of 4 to 6, and

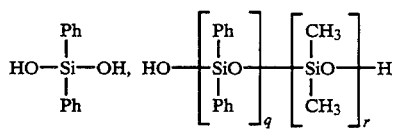

wherein Ph represents phenyl and q and r are each a number of 2 to 4.

The amount of component (d) to be used is in the range of 1 to 20 parts by weight based on 100 parts by weight of component (a). A smaller amount thereof would not afford the effect of resistance to weather and to erosion, while a larger amount thereof would result in marked deterioration of processability.

As silicone rubber vulcanizing methods there are known a vulcanizing method using an organic peroxide and a vulcanizing method utilizing an addition reaction which employs a platinum catalyst and an organohydrogenpolysiloxane as a crosslinking agent. The vulcanizing method used in the present invention is limited to the former, i.e., a vulcanizing method using an organic peroxide. Heretofore, it has been known that if the platinum catalyst used in the vulcanizing method which utilizes an addition reaction is incorporated into a silicone rubber composition, the flame retardancy of the silicone rubber is improved. However, if such a flame-retarding process is adopted in preparing the composition for high voltage electrical insulators of the present invention, there will occur a localized erosion phenomenon, resulting in marked deterioration in the service life of the electrical insulating function. This was ascertained by the present inventors. Therefore, it is the essence for the silicone rubber composition of the present invention to exclude the use of such platinum catalyst.

As examples of the organic peroxide used as component (e) in the present invention, there are mentioned those which have been known heretofore, such as benzoyl peroxide, 2,4-dichlorobenzoyl peroxide, 2,5-bis(t-butylperoxy)-2,5-dimethylhexane, dicumyl peroxide, monochlorobenzoyl peroxide, and t-butyl perbenzoate. The amount of component (e) to be used is in the range of 0.05 to 6 parts by weight based on 100 parts by weight of component (a). The component (e) may be in the form of paste of the organic peroxide dispersed in a conventional silicone oil.

The silicone rubber composition of the present invention can be obtained easily by merely mixing the components (a) to (e) intimately. According to purposes and as long as the intended properties in the invention are not impaired, there may be added various known additives such as, for example, red iron oxide, cerium oxide, cerium hydroxide, fatty acid salt of cerium, fatty acid salt of iron, titanium oxide, and carbon black.

The silicone rubber composition of the present invention described above is characterized by being superior in the resistance to arc, to erosion, to tracking and to weather as well as in water repellency under conditions in which the silicone rubber after heat-vulcanization is subjected to severe contamination or weather. Making the most of this feature, the composition of the invention is used suitably as a silicone rubber which constitutes the electrical insulator portion of an insulator or an insulating device.

EXAMPLES

The present invention will be described below in terms of a working example thereof, in which "part" and "parts" are by weight, the value of viscosity is at 25° C., and "cst" represents centistoke.

Example 1

100 parts of a diorganopolysiloxane gum (degree of polymerization: 5000) consisting of 99.8 mole % dimethylsiloxane units and 0.2 mole % methylvinylsiloxane units, 4.0 parts of a dimethylsiloxane oligomer end-blocked with silanol groups and having a viscosity of 60 cSt, 4.0 parts of diphenylsilanediol and 40 parts of fumed silica having a specific surface area of 200 m²/g were fed into a kneader mixer and kneaded to a homogeneous extent under heating. Then, 100 parts of aluminum hydroxide having an average particle diameter of 1 μm was kneaded with 100 parts of the resulting rubber base on two rolls to prepare a silicone rubber composition 1.

On the other hand, a silicone rubber composition 2 was prepared under the same conditions as in the preparation of the silicone rubber composition 1 except that 8.0 parts of a methylphenylsiloxane oligomer end-blocked with silanol groups having a viscosity of 60 cSt was used in place of 4.0 parts of the dimethylsiloxane oligomer end-blocked with silanol groups having a viscosity of 60 cSt and 4.0 parts of the dimethylsiloxane oligomer end-blocked with silanol groups having a viscosity of 60 cSt and 4.0 parts of the diphenylsilanediol as components (d).

Further, a silicone rubber composition 3 (comparative example) was prepared under the same conditions as in the preparation of the silicone rubber composition 1 except that 9.0 parts of only the dimethylsiloxane oligomer end-blocked with silanol groups having a viscosity of 60 cSt was used in place of both components (d). The silicone rubber compositions 1 to 3 were vulcanized and then subjected to accelerated weather resistance test, a salt-fog aging test and a merry-go-round test.

Results of Accelerated Weather Resistance Test 0.3 part of 2,5-dimethyl-2,5-bis(t-butylperoxy)-hexane as a vulcanizing agent was added to 100 parts of each of the silicone rubber compositions 1 to 3. After vulcanizing at 140° C. for 20 minutes under pressure, the vulcanized compositions were each subjected to a post cure at 170° C. for 4 hours to obtain silicone rubber sheets each 150 mm×7.5 mm×2 mm (thickness).

For each of the sheets, 4-hour UV radiation (using UV-B lamp, at 60° C.) and 4-hour moisture condensation (50° C.) were repeated using a weathering tester conforming to ASTM G53, whereby each sheet was exposed to dewdrops for a total of 10,000 hours or more. For the evaluation of weathering resistance, its surface gloss retaining property was checked and the section thereof was observed using a scanning electron microscopy. The results obtained are as follows.

The sheets using the silicone rubber compositions 1 and 2 retained their surface gloss, while the surface gloss of the sheets using the silicone rubber composition 3 as a comparative example was lost. According to the observation using scanning electron microscopy, the thickness of a deteriorated layer of the sheets using the silicone rubber composition 1 and that of the sheets of the silicone rubber composition 2 were 5 μm respectively and thus extremely small, while the thickness of a deteriorated layer of the sheet using the silicone rubber composition 3 was as large as 20 μm.

Results of Salt-fog Aging Test

The vulcanizing agent was added to each of the silicone rubber compositions in the same manner as above, then each silicon rubber composition was wound round an FRP rod having a length of 110 mm and a diameter of 16 mm and thereafter vulcanized at 140° C. for 20 minutes under pressure so that the length and diameter were 100 mm and 25 mm, respectively, with 5 mm space remaining at each end, followed by a post cure at 170° C. for 4 hours to prepare test pieces.

In this salt-fog aging test, as shown in FIG. 1, brass electrodes were attached to both ends of each test piece, then the test piece was fixed inclinedly by 60° C. with respect to the water level and 2,400 μs/cm of salt water was sprayed to the test piece (number of nozzles: 4, nozzle revolution: 51 sec/1 r.p.m., amount of spray: 920 cc/min, spray pressure: 3.0 kgt/mm$^2$) while the test piece was charged with AC 2,800V continually. Evaluation was made in terms of time required for the erosion depth of the silicone rubber portion of the test piece to reach 6 mm. The results of this test are as follows. In Example 1, the test piece using the silicone rubber composition 1 . . . 1,150 hours, the test piece using the silicone rubber composition 2 . . . 1,300 hours. In the comparative example, the test piece using the silicone rubber composition 3 . . . 600 hours.

Results of Merry-Go-Round Test

The vulcanizing agent was added to each silicone rubber composition in the same manner as above, then the silicone rubber composition was injection-molded (140° C., 20 minutes) to an FRP rod having a length of 250 mm or more and a diameter of 16 mm so as to become 25 mm in diameter, followed by a secondary vulcanization at 170° C. for 4 hours to prepare a test piece.

A merry-go-round test was conducted using the apparatus shown in FIG. 2. Stainless steel electrodes were attached to each test pieces at an inter-electrode spacing of 120 mm, then the test piece was mounted to a disk. The disk was inclined 30° with respect to vertical and there was repeated an intermittent cycle of immersion in an intra-tank contaminated liquid (1.3 ms/cm) and 10 KV charging at a rate of 1 r.p.m. (charging: upper 50%, immersion in the contaminated liquid: lower 30%).

For evaluation, the section of each test piece at 120,000 cycles was observed using a scanning electron microscopy, and a comparison was made about the thickness of a deteriorated layer of the silicone rubber portion. The leakage current of the test piece using the silicone rubber composition 1 and that of the test piece using the silicone rubber composition 2 were smaller than that of the test piece using the silicone rubber composition 3 as a example. Deteriorated layer thickness of the silicone rubber portion of the test pieces using the silicone rubber compositions 1, 2 and 3 were 15 μm, 20 μm and 60 μm, respectively.

The silicone rubber composition for high voltage electrical insulators according to the present invention can afford a rubbery elastomer superior in high voltage electrical insulating characteristics such as the resistance to weather, to erosion, to tracking and to arc under severe contamination or weather conditions after heat-curing because the composition comprises the components(a) to (e) and does not contain a platinum catalyst.

BRIEF DESCRIPTION OF THE DRAWINGS

FIG. 1 is a schematic transverse section of the rainfall charge tester used in Example 1;

FIG. 2 is schematic vertical section thereof; and

Figure 3:
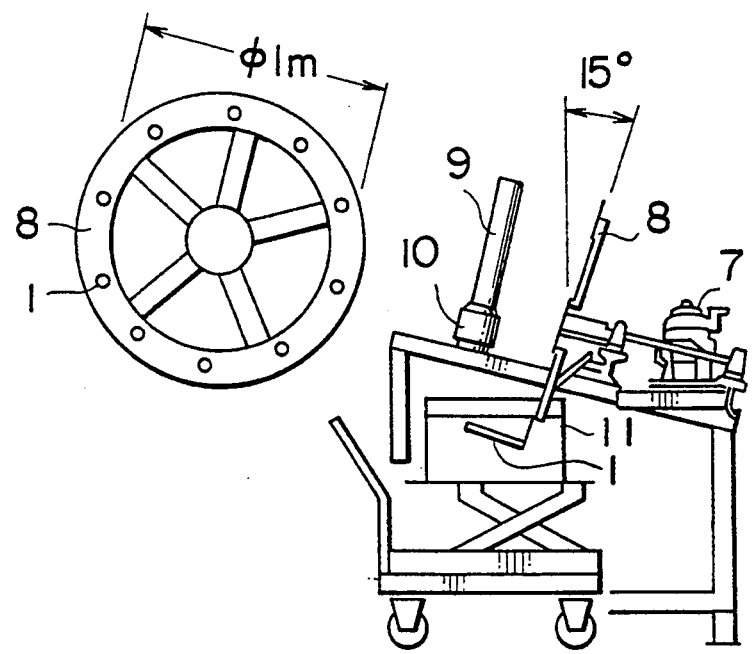
FIG. 3 is a schematic side view of the merry-go-round tester used in Example 1.

1—test piece
2—electrode
3—test vessel
4—salt water
5—nozzle
6—pump
7—motor
8—disk
9—power source ring
10—insulator 11—contaminated liquid tank

What is claimed is:

1. A process for insulating high voltage electrical conducting media comprising the step of insulating a high voltage electrical conducting medium with a composition which excludes a platinum catalyst, said composition consisting essentially of:

(a) 100 parts by weight of an organopolysiloxane gum represented by the average unit formula $$R_a SiO_{\frac{4-a}{2}},$$

where R is a monovalent hydrocarbon group of which at least 50 mole % is alkyl; and a is a number of 1.98 to 2.02;

(b) 10–100 parts by weight of a finally divided silica filler;

(c) 15–300 parts by weight of aluminum hydroxide;

(d) 1–20 parts by weight of an organosilane or an organosiloxane oligomer represented by the general formula $$HO-\left[\begin{array}{c} R^1 \\ | \\ SiO \\ | \\ R^2 \end{array}\right]_m \left[\begin{array}{c} CH_3 \\ | \\ SiO \\ | \\ CH_3 \end{array}\right]_n - H$$

where $R^1$ and $R^2$, which may be the same or different, are each an unsubstituted or substituted monovalent hydrocarbon group, with the proviso that at least one $R^1$ and $R^2$ is phenyl; m is an integer of 1 to 20; and n is 0 or an integer of 1 to 20; and (e) 0.05–6 parts by weight of an organic peroxide.

2. A process as set forth in claim 1, wherein said organopolysiloxane gum has a viscosity of higher than $10^6$ centistokes at 25° C. and an average molecular weight of larger than $5 \times 10^4$.

3. A process as set forth in claim 1, wherein said finely divided silica filler has an average particle diameter of smaller than 50 μm and a specific surface area of larger than 100 m²/g.

4. A process as set forth in claim 1, wherein said aluminum hydroxide is represented by the formula $Al_2O_3 \cdot 3H_2O$ and has an average particle diameter of smaller than 5 μm.

5. A process as set forth in claim 1, wherein said organosiloxane oligomer is a member selected from the group consisting of $$HO-\left[\begin{array}{c} CH_3 \\ | \\ SiO \\ | \\ Ph \end{array}\right]_p - H$$

where p is a number of 4 to 6, $$\begin{array}{c} Ph \\ | \\ HO-Si-OH \\ | \\ Ph \end{array} \text{ and, } HO-\left[\begin{array}{c} Ph \\ | \\ SiO \\ | \\ Ph \end{array}\right]_q \left[\begin{array}{c} CH_3 \\ | \\ SiO \\ | \\ CH_3 \end{array}\right]_r - H$$

where Ph is phenyl, q and r are each a number of 2 to 4.

* * * * *